United States Patent Office 2,967,185
Patented Jan. 3, 1961

2,967,185

PREPARATION OF MALEIC ANHYDRIDE AND CATALYST THEREOF

Mitchell Becker, Plainview, and Robert S. Barker, Port Washington, N.Y., assignors, by mesne assignments, to Scientific Design Company, Inc., a corporation of Delaware No Drawing. Filed May 29, 1957, Ser. No. 662,324

12 Claims. (Cl. 260—346.8)

This invention relates to preparation of an improved catalyst for the manufacture of maleic anhydride, to a process wherein catalyst support is contacted with acid prior to catalyst manufacture, and a process for the production of maleic anhydride utilizing said improved catalyst.

The preparation of maleic anhydride by the catalytic partial oxidation of benzene is well known and has achieved considerable success commercially. Generally, such processes employ vanadia or vanadia and molybdena material as a catalyst. This catalyst is coated or impregnated on a support of large geometric or specific surface. This procedure increases significantly the effect of the catalyst, provided the material of which the support is composed is inert so as not to interfere with, or poison the reaction. Now, the art is confronted with the problem of providing catalysts including support, for the manufacture of maleic anhydride, which provide increased product yield over the present commercial yields of 55 to 65 weight percent and improved economy.

An important object of the present process is to increase significantly the product yield.

Another object of the present process is to provide a process by which catalyst support may be reclaimed from exhausted catalyst and thus provide improved economy.

Other and further objects will be apparent to those skilled in the art upon reading the following description.

It has been found in a process for preparation of catalyst support for the manufacture of maleic anhydride by the catalytic partial oxidation of benzene, that contacting said catalyst support with strong acid for at least about 2 hours at a temperature of about 20 to 200 degrees centigrade will increase significantly the product yield.

This invention in another aspect concerns a process for the preparation of maleic anhydride which comprises the partial oxidation of benzene with molecular oxygen in the presence of a catalyst consisting essentially of a refractory support in particulate form of about 0.2 to about 0.5 inch average diameter, and having a surface area in the range of about 0.002 to 10 square meters per gram, said support being prepared by contacting with strong acid for at least about 2 hours at a temperature of about 20 to 200 degrees centigrade; a mixture of about 1 part $MoO_3$, 1.5 to 8 parts $V_2O_5$, 0.1 to 0.01 part $P_2O_5$, 0.1 to 0.01 part Na, and 0.1 to 0.01 part Ni, containing about 3 to 15 parts per weight of support per part of said mixture, said catalyst being obtained by providing the catalyst support with a mixture of the precursor of the above materials, drying at a temperature up to about 175° C., heating at a temperature in the range of about 175 to 320° C. with a linear air flow through the catalyst in the range of 0 to 7.7 cm./min. and then heating at a temperature in the range of 320 to 400° C. with a linear air flow in the range of 0.58 to 21.1 cm./min. at a temperature in the range of the range of about 350 to 550° C., and recovering maleic anhydride from the reaction mixture.

This invention in still another aspect concerns a catalyst useful for the preparation of maleic anhydride by the partial oxidation of benzene with molecular oxygen at a temperature in the range of about 350 to 550° C. consisting essentially of a refractory support in particulate form of about 0.2 to about 0.5 inch average diameter, and having a surface area in the range of 0.002 to 10 square meters per gram, said support being prepared by contacting the support with strong acid for at least about 2 hours at a temperature of about 20 to 200 degrees centigrade; a mixture of about 1 part $MoO_3$, 1.5 to 8 parts $V_2O_5$, 0.1 to 0.01 part $P_2O_5$, 0.1 to 0.01 part Na, and 0.1 to 0.01 part Ni, containing about 3 to 15 parts per weight of support per part of said mixture, said catalyst being obtained by providing the catalyst support with a mixture of the precursor of the above materials, drying at a temperature up to about 175° C., heating at a temperature in the range of about 175 to 320° C. with a linear air flow through the catalyst in the range of 0 to 7.7 cm./min. and then heating at a temperature in the range of 320 to 400° C. with a linear air flow in the range of 0.58 to 21.1 cm./min. at a temperature in the range of about 350 to 550° C.

It has further been found that if a catalyst prepared initially on a support resulting, for one reason or another, in a yield of less than 85 weight percent maleic anhydride, the catalyst may be removed and the support submitted to the acid-wash procedure for an additional period of at least two hours. The catalyst prepared on the reclaimed support will provide maleic anhydride yields of 85 to 90 weight percent. This points out the fact that a two hour acid-wash may be used to reclaim the support from catalyst initially providing a low yield.

It has been found that the acid-wash process of this invention under preferred conditions of reaction may be employed to technically advance the maleic anhydride catalyst art by (1) increasing the yields of maleic anhydride catalyst using acceptable catalyst support; (2) substantially increasing the yield when using catalyst initially resulting in low yield; and (3) reclaiming catalyst support from exhausted catalyst.

The support particles may be alumina, magnesia, zirconia, mullite, beryllia or the like material which is stable at elevated temperatures up to about 600° C.

The catalyst supports may be prepared in spherical form in any known manner, forming spheres preferably ranging in diameter from 0.20 inch to 0.50 inch. The size of the spheres may be decreased or increased from the preferred size range for particular uses. For commercial operations, a sphere size of ⅜ inch is preferred.

The spheres may be prepared in any convenient manner; e.g. by reduction of the raw materials to finely divided form, e.g., 50–200 mesh, then extruding or otherwise shaping into cylinders of approximately the desired dimension. If desired, a small proportion of finely divided ceramic binder may be included in the raw material, e.g., clay, glass, or the like up to about 15 percent by weight. The soft cylinders are then tumbled until they acquire a spherical shape. The spheres preferably are then tumbled in the presence of a fine powder of 40 mesh particle size more or less, composed of a volatilizable or ignitable material such as naphthalene. The spheres are then kiln roasted, the volatile powder adhering to the spheres being driven off, leaving the surface of each sphere in a highly roughened state, without modifying the overall spherical shape.

The roughened surfaces of the spheres as accomplished above, in no way modify the overall spherical shape of the spheres. The depth of the surface irregularities approximates between .005 to 0.05 of an inch, which enormously increases the outer surface area of the spheres. For example, with magnesia spheres of approximately one quarter inch in diameter, the outer surface area will approximate 110 square inches per pound, containing roughly 500 spheres. The outer surface area of the roughened spheres, on the other hand, will approximate 579,000 square inches per pound, approximately 5,500 times that of smooth spheres.

The preferred alumina spheres are ceramically bonded fused alpha alumina particles having the following physical properties (ASTM method):

Porosity: 41–45% (vol.)
Water absorption: 20–23% (wt.)
Bulk density (indiv. support): 2.1–1.9 gr./cc.
Surface area (nitrogen absorption): 0.025–0.057 sq. m./gr.

The strong acids to be employed in accordance with this invention are the mineral acids such as hydrochloric acid, nitric acid, sulfuric acid, and phosphoric acid and the organic acids having an acid dissociation constant ($K_a$) of $10^{-5}$ or greater, such as acetic acid, trichloroacetic acid, oxalic acid, benzoic acid and maleic acid. These acids, aqueous solutions, and/or combinations of these acids can be employed at concentrations of 10 to 100 weight percent, 20 to 200 degrees centigrade and at 1 to 5 atmospheres of pressure. The preferred acid is hydrochloric acid and the preferred concentration range is 32 to 42 weight percent.

The contact time employed in the acid-wash should be at least about two hours. It has been found that the degree of improvement of maleic anhydride yield as related to treatment time will be greatest when the catalyst support is submitted to the acid-wash process for from 2 to 10 hours. The preferred contact time is influenced by the acid employed, its concentration and the reflux temperature.

The reflux temperature during the acid-wash process may be maintained between about 20 to 200 degrees centigrade and is dependent upon the acid employed, its concentration and its boiling point. The more satisfactory temperature range is about 60 to 130 degrees centigrade, and the preferred range is about 90 to 105 degrees centigrade.

The acid concentration is dependent upon the acid employed and may vary within very wide limits. Utilizing hydrogen chloride it is preferred to maintain the acid concentration between about 10 to 45 weight percent, although the more satisfactory range is 20 to 42 weight percent, and the preferred range is 32 to 42 weight percent.

The ratio of catalyst support to acid solution should be sufficient to keep the support submerged in the acid. Generally, a ratio of between about 1 to 0.25 and 1 to 15 is satisfactory, although the more satisfactory range is 1 to 0.5 and 1 to 5, and the preferred range is 1 to 1.3 and 1 to 1.7. It is understood that any method of continuously wetting the catalyst support with acid, such as hot spraying, will be embraced within the scope of this invention.

The catalyst may be prepared by first dissolving the ammonium molybdate in HCl. A light yellow solution results. When all the molybdate is dissolved, the ammonium meta-vanadate is added. A dark solution results. From past experience it is known that after a period of 10 minutes of agitation, the vanadate is completely dissolved. The solubility of the molybdate is less than that of the vanadate and so it is put into solution first. The nickel and sodium components are dissolved separately in water. The water solutions cannot be mixed due to a nickel phosphate precipitate that results. The sodium phosphate water solution is first added to the HCl solution followed by the addition of the nickel nitrate solution. The entire solution is agitated for 5–10 minutes, after which it is ready to be used for the coating operation.

Generally, in the coating step, the temperature should not exceed about 80° C.

The coated material is placed in an activator such as a Pyrex glass tube 3¾ inch I.D. and 48 inches in length, provided with external heating means such as electric resistance heating elements. The activator is provided with an air inlet at its center (intermediate each end). The activator tube may be set in any desired position, but for convenience, the horizontal position is preferred. The activator is completely filled with a catalyst material and then heated according to the following air flow ranges:

| Heat Stages | Temp. Range, ° C. | Linear air flow rate in cm./min. |
|---|---|---|
| 1st | up to 175 | 7.0–70. |
| 2nd | 175–320 | 0–7.7. |
| 3rd | 320–400 | 0.58–21.1. Desirably 3.5–13.0. Preferably 5.8–9.4. |

The catalyst material should be held at 400° C. for at least 30 minutes before increasing the air flow, to speed up desorption of evolved vapors. In this way, a high activity dark green catalyst is obtained.

The catalyst can be activated in an oven, under conditions of heating and contact with air. In this case, the catalyst is placed in shallow trays and heated by radiation from above. The oven and the trays should be preheated to about 400° C. The catalyst is then placed in the hot trays and inserted in the oven. The oven temperature should be closely controlled at about 400° C. and the heating should be uniform. Heating is by radiation and the location of the heating elements is such that completely uniform heating occurs. No air circulation is preferred. The depth of catalyst is critical and adjusted such that the catalyst contacts the exact amount of air required. This depth is a function of catalyst particle size, being about ½ inch for a 4–8 mesh (U.S. Sieve) catalyst and ¾ inch for a 2–4 mesh catalyst.

Excessive contact with air results in a poor catalyst. However, air is essential. In cases where air was completely excluded or where it was substituted by nitrogen, a catalyst having a dark blue color resulted, which also gave very poor yields, on the order of 30–40 percent.

This method of catalyst manufacture is also applicable to catalyst prepared by impregnation, by mechanical mixing of catalyst and support powder with or without the use of a pelletizing machine, by catalyst coating techniques using spray methods, or any other technique employing a support and catalyst combination technique using the above formulations and preparations.

The following detailed examples are given for purposes of illustrating the present process and the advantages derived therefrom. It is to be understood, however, that the invention is not to be considered as being limited by the specific modes or conditions of operation disclosed, or to the specific reactants employed. Where parts are mentioned, they are parts by weight.

*Example 1*

To 1,000 parts of 3–5 mesh fused aluminum oxide contained in apparatus complete with heating and reflux means is added 1,400 parts of 36 percent hydrochloric acid. The acid is permitted to reflux gently for seven hours at 1 atm. absolute pressure. The acid is decanted off and the support is washed with three portions of cold water, each portion being 1,000 parts. This washed support is then used to fabricate the maleic anhydride catalyst as described herein to provide a catalyst having the following analytical composition (without regard to the exact chemical combination or form thereof) all parts being by weight:

| Component: | Parts |
|---|---|
| $MoO_3$ | 1 |
| $V_2O_5$ | 1.5–8 |
| $P_2O_5$ | 0.1–0.01 |
| Na | 0.1–0.01 |
| Ni | 0.1–.0001 |

This catalyst is charged into a vertical reactor tube of ⅝ inch internal diameter, to a bed height of 120 inches. The inner surface of the reactor tube may be of ordinary carbon steel, but preferably is of corrosion resistant material, such as stainless steel, and it may be surrounded with a temperature regulating medium, such as molten salt, molten metal or the like. For small scale or single tube runs, the tube may be surrounded by a copper jacket and this jacket surrounded by electrical heating coils, to maintain the desired reaction temperature.

The pressure drop through the reactor is in the range of 0.5 to 10 p.s.i.g.

A benzene-air mixture is fed downward through the reactor at a linear velocity of one foot per second calculated at reaction conditions. The feed mixture contains 1.4 mol percent of benzene in air, and the reaction temperature is maintained in the range of 350 to 450° C. The product is recovered in known manner. Over a long period of time the weight yield of maleic anhydride is in the range of about 85 to 90 percent or more based on the benzene feed; and no evidence is found of decreasing yield with long reaction times. This is a surprisingly high yield and catalyst life as compared to commercial catalysts.

When catalyst prepared as in Example 1 is employed on commercially available catalyst support not subject to contact with strong acid, the weight yield of maleic anhydride is in the range of 78 to 80 percent.

*Example 2*

The above example is repeated, except that instead of hydrochloric acid, 1,500 parts of 30 weight percent sulfuric acid is permitted to reflux gently for ten hours at atmospheric pressure. The support prepared in this manner is washed and then used to fabricate a maleic anhydride catalyst. Use of this catalyst gives yields comparable to those set forth in Example 1.

*Example 3*

Example 1 is repeated, except that instead of hydrochloric acid, 1.700 parts of 80 weight percent acetic acid is permitted to reflux gently for ten hours at atmospheric pressure. The support prepared in this manner is washed and then used to fabricate a maleic anhydride catalyst as herein described. Use of this catalyst gives yields comparable to those set forth in Example 1.

Substitution of similar quantities of such mineral acids as nitric and phosphoric acid and such organic acids as trichloroacetic acid, oxalic acid, benzoic acid and maleic acid yield comparable results.

In view of the foregoing disclosures, variations and modifications thereof will be apparent to one skilled in the art and it is intended to include within the invention all such variations and modifications except as do not come within the scope of the appended claims.

We claim:

1. In a process for preparation of catalyst support particles for subsequent addition of catalytic materials to produce catalyst for the manufacture of maleic anhydride by the catalytic partial oxidation of benzene, the step which comprises: contacting refractory catalyst support particles with an acid having a dissociation constant greater than about $10^{-5}$ for at least about 2 hours at a temperature of about 20 to 200 degrees centigrade, prior to catalyst manufacture.

2. The process according to claim 1 wherein said acid is inorganic acid.

3. The process according to claim 1 wherein said acid is hydrochloric acid.

4. The process according to claim 1 wherein said acid is an organic acid.

5. In a process for preparation of catalyst support particles for subsequent addition of catalytic materials to produce catalyst for the manufacture of maleic anhydride by the catalytic partial oxidation of benzene, the step which comprises: contacting refractory catalyst support particles with inorganic acid having a dissociation constant greater than about $10^{-5}$ having a concentration of 10 to 45 weight percent for at least about 2 hours at a temperature of about 20 to 200 degrees centigrade, prior to catalyst manufacture.

6. In a process for preparation of aluminum oxide support particles for subsequent addition of catalytic materials to produce catalyst for the manufacture of maleic anhydride by the catalytic partial oxidation of benzene, the step which comprises: contacting said catalyst support with about 20 to 42 weight percent hydrochloric acid for at least about 2 hours at a temperature of about 60 to 130 degrees centigrade, prior to catalyst manufacture.

7. A process for the preparation of maleic anhydride which comprises the partial oxidation of benzene with molecular oxygen in the presence of a catalyst consisting essentially of a refractory support in particulate form of about 0.2 to about 0.5 inch average diameter, and having a surface area in the range of about 0.002 to 10 square meters per gram, said support being prepared for subsequent addition thereto of catalytic materials by contacting the support with an acid having a dissociation constant greater than about $10^{-5}$ for at least about 2 hours at a temperature of about 20 to 200 degrees centigrade; and a mixture of about 1 part $MoO_3$, 1.5 to 8 parts $V_2O_5$, 0.1 to 0.01 part $P_2O_5$, 0.1 to 0.01 part Na, and 0.1 to 0.0001 part Ni, containing about 3 to 15 parts per weight of support per part of said mixture, said catalyst being obtained by providing the catalyst support with a mixture of the precursor of the above materials, drying at a temperature up to about 175° C., heating at a temperature in the range of about 175 to 320° C. with a linear air flow through the catalyst in the range of 0 to 7.7 cm./min. and then heating at a temperature in the range of 320 to 400° C. with a linear air flow in the range of 0.58 to 21.1 cm./min. at a temperature in the range of about 350 to 550° C., and recovering maleic anhydride from the reaction mixture.

8. The process according to claim 7 wherein said acid is hydrochloric acid.

9. The process according to claim 7 wherein said acid is organic acid.

10. A catalyst useful for the preparation of maleic anhydride by the partial oxidation of benzene with molecular oxygen at a temperature in the range of about 350 to 550° C. consisting essentially of a refractory support in particulate form of about 0.2 to about 0.5 inch average diameter, and having a surface area in the range of 0.002 to 10 square meters per gram, said support being prepared for subsequent addition thereto of catalytic materials by contacting the support with an acid having a dissociation constant greater than about $10^{-5}$ for at least about 2 hours at a temperature of about 20 to 200 degrees centigrade; and a mixture of about 1 part $MoO_3$, 1.5 to 8 parts $V_2O_5$, 0.1 to 0.01 part $P_2O_5$, 0.1 to 0.01 part Na, and 0.1 to 0.0001 part Ni, containing about 3 to 15 parts per weight of support per part of said mixture, said catalyst being obtained by providing the catalyst support with a mixture of the precursor of the above materials, drying at a temperature up to about 175° C., heating at a temperature in the range of 175 to 320° C. with a linear air flow through the catalyst in the range of 0 to 7.7 cm./min.

and then heating at a temperature in the range of 320 to 400° C. with a linear air flow in the range of 0.58 to 21.1 cm./min. at a temperature in the range of about 350 to 550° C.

11. A catalyst according to claim 10 wherein said acid is hydrochloric acid.

12. A catalyst according to claim 10 wherein said acid is organic acid.

References Cited in the file of this patent

UNITED STATES PATENTS 2,777,860     Egbert et al. _____ Jan. 15, 1957